Patented Feb. 29, 1944

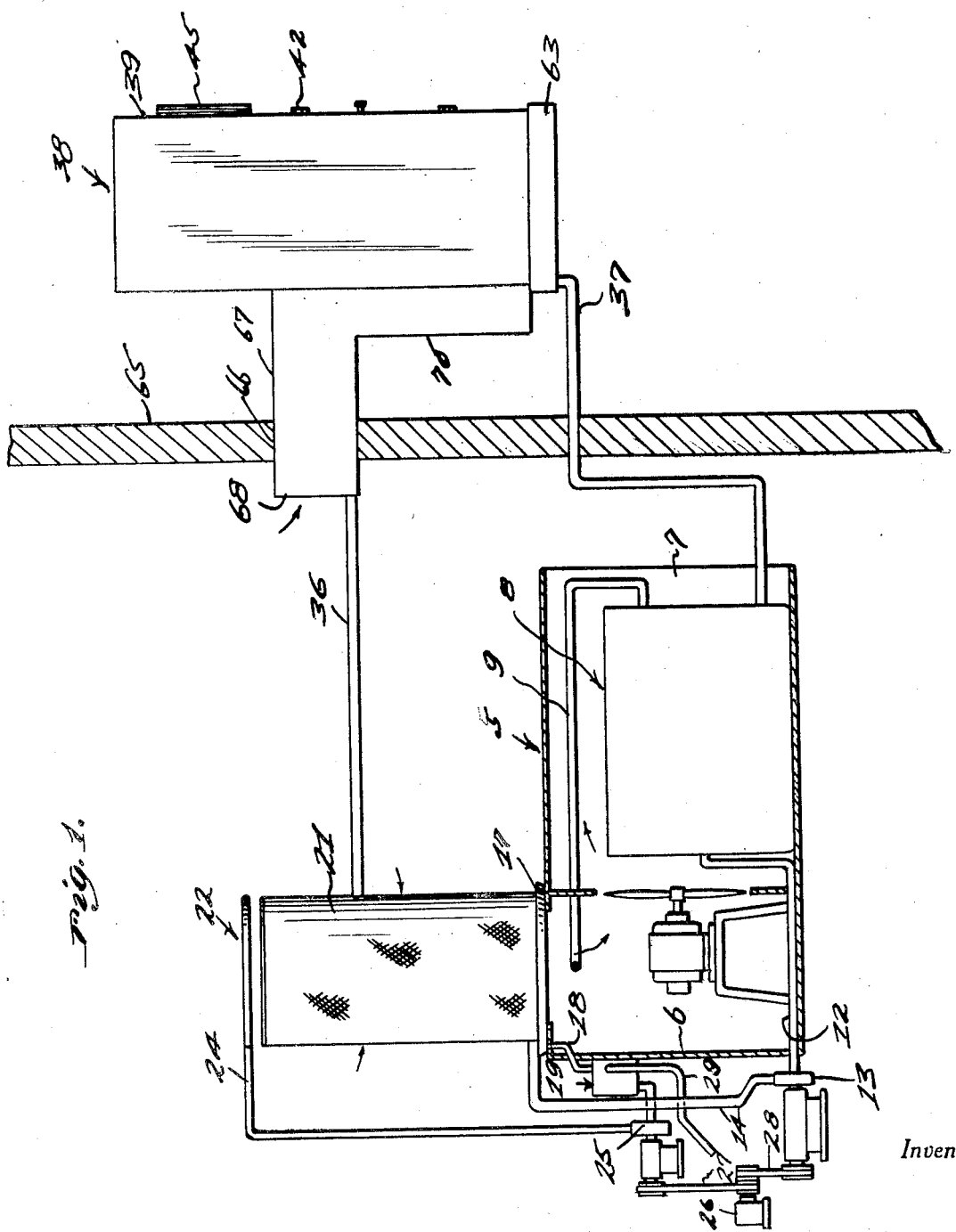

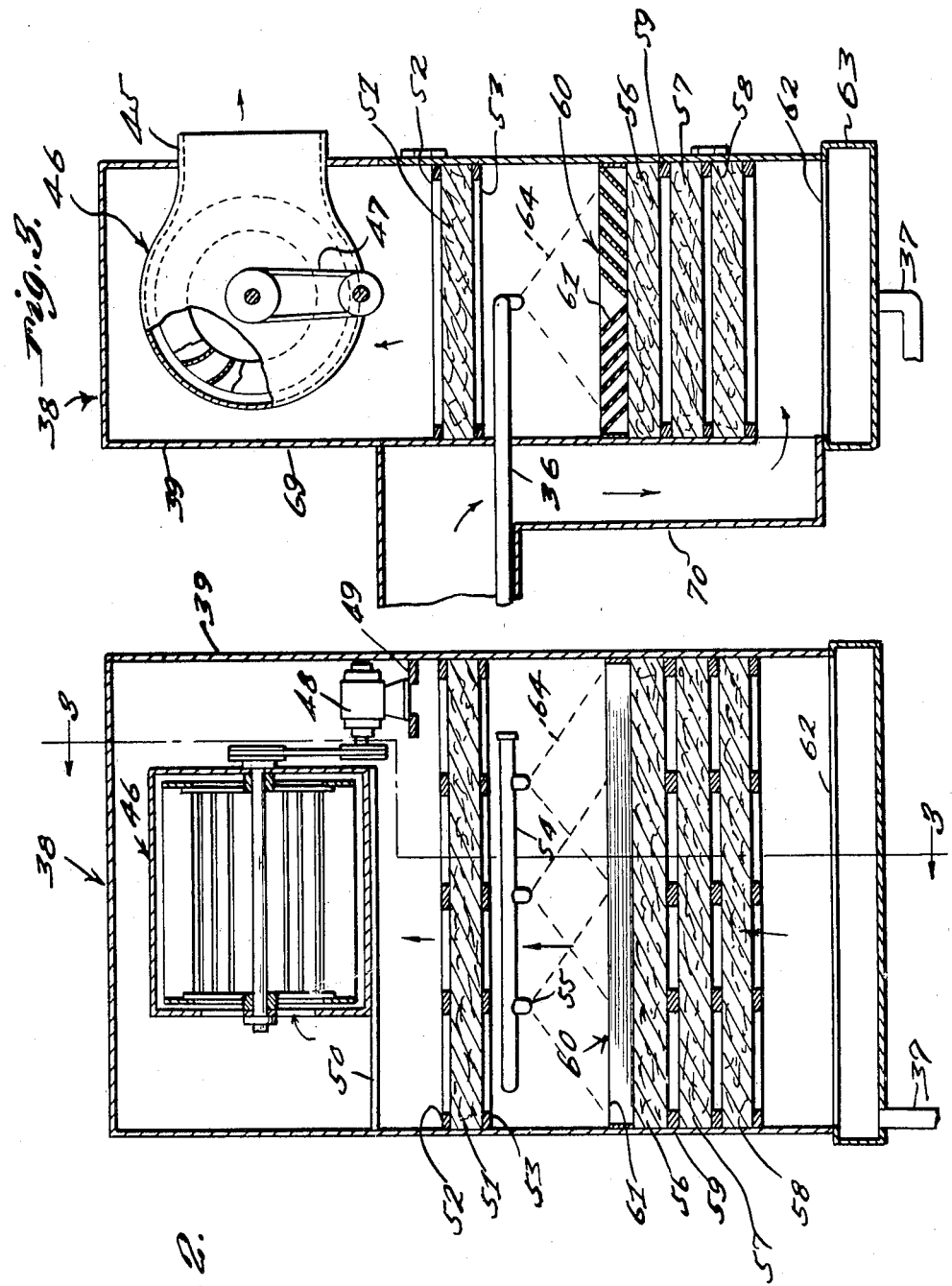

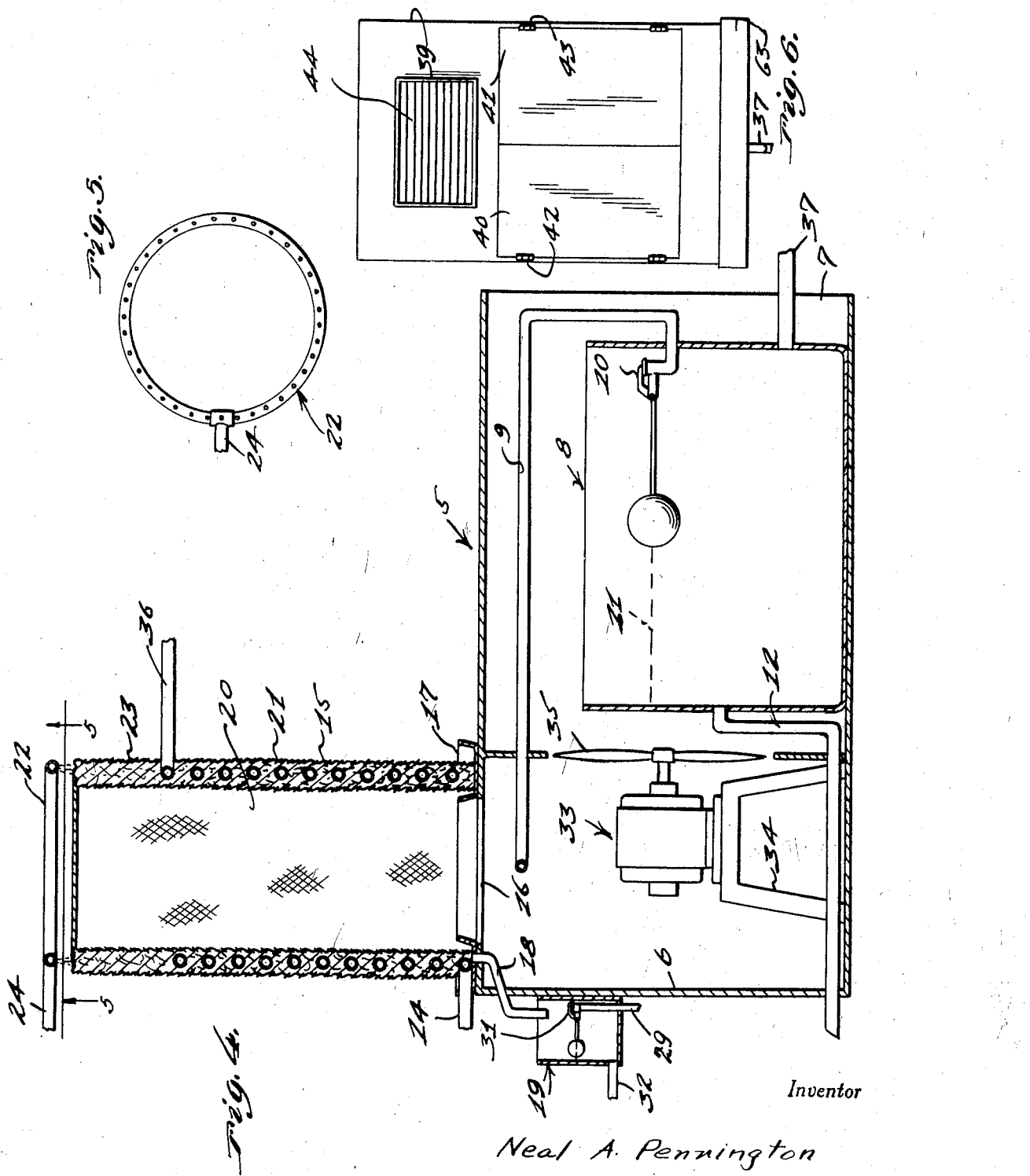

2,342,689

UNITED STATES PATENT OFFICE 2,342,689

SYSTEM FOR COOLING AND HUMIDIFYING AIR

Neal A. Pennington, Tucson, Ariz., assignor of one-half to Robert H. Henley, Tucson, Ariz.

Application October 4, 1940, Serial No. 359,813

11 Claims. (Cl. 62—129)

The present invention relates to the art of air conditioning, and relates in particular to the cooling and humidifying of outside air for the introduction to homes, threatres, auditoriums, business places and the like of air at a temperature and relative humidity most conducive to health, comfort and efficiency, and the primary object of invention is to provide an arrangement of this character which delivers the air at the desired temperature and relative humidity at a minimum cost per cubic foot per minute, without the use of a mechanical refrigerating unit or of an outside water tower.

In certain areas of the country where the evaporative air cooler or the air washer is widely used to produce air of a lower dry bulb temperature, with no corresponding lowering of its wet bulb temperature, but instead an increase in the relative humidity through operation at a constant wet bulb, the present arrangement is particularly useful and applicable. The present invention contemplates the well established fact that the total heat of air comprises the arithmetical sum of its sensible heat plus its latent heat. Therefore, the evaporative type of air coolers or air washers depend entirely on evaporation for the cooling effect thereof and they merely remove the sensible heat from the air and replace it calorie for calorie with latent heat in the form of humidity. The total heat of the air remains the same throughout the operation and the air delivered is undesirable because of its high moisture content and its failure to meet the three primary requirements for healthful and comfortable air, namely, purity, moderate dry bulb temperature, and moderate relative humidity.

Especially in the geographic areas mentioned the air to be conditioned generally possesses a lower humidity than is desirable, so that especially in these areas the advantages of the present invention are particularly conspicuous in that the present arrangement results in (1) cooling the air without adding excessive moisture (latent heat); (2) addng moisture to the desired amount to the dry air to produce the proper relative humidity, these being results which are not at all accomplished by the water tower cooler and are accomplished by the refrigerative cooler only at considerable additional cost; and (3) accomplishing these things at a much lower cost than for refrigeration or for cooling tower operation.

The above and other important objects and advantages of my invention will be apparent from a reading of the following description taken in connection with the appended drawings, wherein for purposes of illustration I have shown a preferred embodiment of my invention.

In accordance with the present invention, part of the sensible heat is withdrawn from the air to be conditioned, by evaporation of a solution of a hygroscopic salt in water, the sensible heat being replaced with an identical amount of latent heat, so as to humidify the dry air to the proper degree. The removal of sensible heat in this manner removes no actual total heat from the air but serves the dual purpose of removal of sensible heat and humidification. The balance of the cooling effect of the present arrangement is due to contact cooling which actually removes total heat from the air and disposes of it to the air outside of the enclosure being cooled.

In the drawings—

Figure 1 is a general schematic sectional elevational view showing an arrangement in accordance with the present invention, including the outside and inside units.

Figure 2 is an enlarged longitudinal vertical sectional view taken through the inside unit cabinet or casing.

Figure 3 is a transverse vertical sectional view taken through Figure 2 along the line 3—3 and looking in the direction of the arrows.

Figure 4 is an enlarged longitudinal vertical sectional view taken through the outside unit.

Figure 5 is a bottom plan view of the annular water spray tube.

Figure 6 is a front elevational view of the inside unit cabinet or casing on approximately the same scale as Figure 1.

Referring in detail to the drawings, the numeral 5 generally designates an elongated rectangular cross section casing having the closed end 6 and the open end 7, with a general rectangular solution tank 8 resting on the bottom of the casing and having its removable lid spaced from the top of the casing, the tank containing an aqueous solution of a hygroscopic substance such as calcium chloride or other deliquescent salts, or glycerine. A water supply pipe 9 traverses the upper part of the side wall of the tank 8 and terminates in a self-controlled valve 10 which determines the solution level 11. An outgoing pipe 12 connects with the intake of a pump 13 which is located outside of the closed end 6 of the casing 5, the pump having its outlet connected by a pipe 14 with the lowermost convolution of a helical cooling coil 15 which is supported on the top of the casing 5 at the left hand end thereof in circumferentially spaced relation to an opening 16 which is surrounded by a channel-shaped drip pan 17 in which the lower end of the cooling coil is circumferentially positioned. The drip pan has a drain pipe 18 which extends outwardly through the closed end 6 of the casing and empties into a sump tank 19 which is supported on the closed end of the casing. The water which drips into the pan 17 is that which seeps downwardly through excelsior or other similar suitable material which surrounds the convolutions of the coil 15 and is protectively confined on the inner and the outer sides by fabric material covers 20 and 21, respectively, the said water coming from perforations in the annular pipe 22 which is circumferentially arranged above the upper end of the pad 23 constituted by the said excelsior or the like, a water supply pipe 24 being connected to the annular pipe 22 which is connected to the output of a water pump 25. Both the water pump and the solution pump 13 are belted to the motor 26 as indicated by the numerals 27 and 28 so that the pumps run at a constant rate with respect to each other.

The water tank 19 has water supply pipe 29 which terminates at its upper end in a float controlled valve 31 which predetermines the maximum height of the water in the tank 19, the bottom of the tank 19 being connected by the pipe 32 with the intake of the water pump 25.

The motor fan generally designated 33 is mounted on a base 34 with its blades 35 at a suitable level relative to the dimensions and arrangement of the parts of the tank 8 and the casing 5 so as to draw outside air through the sides of the pad 23 in contact with the cooling coil 15 and then downwardly through the opening 16 into the casing 5 and along under the top of the casing 5 in contact with the tank 8, the pipe 9 and the sides of the casing 5 to discharge from the open end 7 of the casing 5 to return to the outside air.

The upper convolution of the cooling coil 15 is the pipe 36 which with the solution drain pipe 37 which enters the lower part of the adjacent end wall of the tank 8 through the opening 7, leads between the apparatus described and the room unit which is generally designated 38 and which is to be located in the room or other space to be supplied with cooled and humidified air of the character described.

The said room unit comprises a vertically elongated generally rectangular casing 39 which is entirely closed except when the front doors 40 and 41 which are hinged adjacent the edges of the front of the casings 42 and 43, respectively, are opened, and except for the horizontal louvre equipped opening 44 in the front wall of the casing above the doors, the said louvres being arranged across the discharge nozzles 45 of a small cage type fan 46 which is mounted in the upper part of the casing 39 and is belted as indicated by the numeral 47 to a small electric motor 48 conveniently mounted on bracket means 49 on the side of the casing, the fan having its own bracket 50 secured from the opposite side of the casing.

Immediately below the fan 46 is a replaceable glass wool filter pad 51 whose purpose is to remove particles of solution entrained in the air passing therethrough. This pad is replaceable when the front doors are open by sliding the same outwardly from between the upper and lower brackets 52 and 53 which are supported in place in the casing from the side and rear walls and a part of the front wall thereof.

Immediately below the filter pad 51 is a transversely arranged spray pipe 54 which has a plurality of nozzles 55 depending therefrom at intervals to spray water or solution down onto the cooling and humidifying pads, three in this instance, designated by the respective numerals 56, 57 and 58, the header 54 being supplied by the pipe 36 leading from the upper end of the cooling coil 15.

The cooling and humidifying pads are formed of excelsior or other suitable similar material with cotton netting or similar fabric material covers on the top and bottom thereof, the pads resting on marginal flanges 59 secured to the walls of the casing 39, these also acting as spacers for keeping the pads vertically spaced from each other.

To prevent the cooling and humidifying pads from being damaged by the impact of the water or solution thereon and the erosion which would otherwise take place, a series of obliquely arranged baffles generally designated 60 is arranged immediately above the upper pad 56, with the individual plates or louvres 61 arranged in parallelly spaced relation in groups, some of the groups having the louvres arranged at opposite inclinations, the effect of which is to break the fall of the water or solution and to cause the spray to be distributed gently all over the top pad 56 without damaging impact, thereby greatly increasing the efficiency of the pads and extending their useful life. Like the pad 51, the pads 56, 57 and 58 are readily removable and replaceable through the front doors of the casing when desirable or necessary.

The lowermost pad 58 is substantially spaced above the lower end 62 of the casing 39, below which end is a solution drain pan 63 from which depends the drain pipe 37 which feeds to the lower part of the tank 8 in the outside unit. The space below the lowermost pad 58 constitutes an air space into which the air is directed for upward travel through the pads 58, 57 and 56, and upwardly through the louvres 61, counter-current to the spray 64 coming from the nozzles 55. The suction action of the fan 46 urges the upward movement of the air which passes beyond the spray 64 through the pad 51 and into the intake of the fan 46, whence the cooled and humidified air is discharged through the nozzle 45 into the room or other place to be cooled. The outer wall 65 of such room or other place to be supplied with cooled and humidified air has an opening 66 through which passes a horizontal relatively large conduit 67 which has an end 68 open to the outside air and has an attachment to the rear wall 69 of the casing 39 with a downwardly projecting portion 70 reaching to the level of the lower end 62 of the casing and communicating with the air space below the lowermost pad 58. The action of the fan 46 draws the outside air into the open end 68 of the conduit 67, so that the outside air passes downwardly through the conduit 70 into the air space below the pad 58 and then travels upwardly through the casing 39 as described to be discharged into the room or other place to be cooled in properly humidified and cooled condition. The solution drain pipe 37 traverses the wall 65 at a suitable point so that the solution in the drain pan 63 will drain gravitationally to return to the tank 8.

As the deliquescent salt or other hygroscopic material aqueous solution is pumped through the coil 15, the pad around the coil being kept saturated by the water dripping from the annular pipe 22, the passage of the air through the pad 23 and against the coils of the coil 15 produces evaporation in the pad and consequent cooling of the solution inside of the coil. The same air then passes over the tank 8 thereby further cooling the solution and also taking up heat from the pipe 9 whence it passes into the outer air through the open end 7 of the casing 5.

Excess water from the coil pad drains back into the pan 17 and passes into the sump tank 19 from which it is pumped back into the coil pad again. By such recirculation water wastage is reduced to a minimum and a lower temperature is obtained. The coil 15 and the pad 23 are placed out of doors. The water lost by evaporation is automatically replaced due to the presence of the float valve in the sump tank 19.

From the coil 15 and through the pipe 36 the cooling solution is forced by the solution pump 13 into the spray head 54 whereby the cooled solution is sprayed downwardly onto the cooling and humidifying pads 56, 57 and 58. The excess solution dripping from the pads is collected in the pan 63 at the bottom of the casing 39, whence it returns by gravity to the tank 8.

The blower fan 46 in the casing 39 indraws warm, dry outside air through the conduit 67, the air passing upwardly through the pad, counter-current to the spray 64 and upwardly through the pad 51, the air being cooled on its upward rush, as it meets the coolest part of the solution last, namely, at the spray 64, thereby receiving maximum cooling. The humidity imparted can be closely controlled by controlling the concentration of the aqueous solution of hygroscopic substance, which, in turn, is kept constant by the operation of the float valve which admits water to the tank 8 as fast as it is evaporated from the solution into the air.

With the arrangements described, air may be cooled to near the wet bulb temperature of the outside air and its humidity raised at the same time to any desired value and there maintained, thus avoiding the near saturation and high humidity which results when air is cooled by the present types of evaporative air coolers or air washers.

It is obvious that through the operation of the described arrangements the air is cooled by evaporation up to a certain point, namely, the point of desired humidity, as in an ordinary evaporative cooler or air washer, but that then the air is cooled the rest of the way by mere contact with the cold salt solution and the cold pads through which the air passes, both cooling effects being achieved in the transit of the air through the same pads. In this way simultaneous cooling and humidification up to any predetermined point and no further, of relatively dry air is achieved by passing the air to be treated through a pad or pads of excelsior or steel wool or other similar suitable material, the pads being saturated with the cold, flowing aqueous solution of hygroscopic substance.

Although I have shown and described herein a preferred embodiment of my invention, it is to be definitely understood that I do not wish to limit the application of the invention thereto, except as may be required by the scope of the subjoined claims.

What is claimed is:

1. A method of cooling and humidifying warm abnormally dry outside air and introducing the resultant into a selected space, said method comprising cooling an aqueous solution of hygroscopic substance, said solution being of such concentration that, when it is at a temperature approximately the wet bulb temperature of the air to be treated, it will have a vapor pressure lying well between the vapor pressure of the air to be treated and the vapor pressure of pure water at that temperature, and maintaining the temperature of the solution near the wet bulb temperature of said outside air, then passing a stream of said warm abnormally dry outside air in countercurrent contact with a stream of the cooled solution so as to simultaneously cool and humidify the air, and directing the resultant air into the said space.

2. A method of cooling and humidifying a stream of warm abnormally dry outside air, said method consisting in cooling by evaporation an aqueous solution of a hygroscopic substance, to and maintaining it at a temperature near the initial wet bulb temperature of said outside air, then simultaneously cooling and humidifying said stream of air by passing said stream of air in countercurrent contact with the cooled aqueous solution, said evaporation being accomplished by passing another stream of warm dry outside air in heat exchange relation to said concurrently evaporating water in heat exchange relation to said solution, and said solution being of such concentration that, when it is at a temperature approximately the wet bulb temperature of the air to be treated, it will have a vapor pressure lying well between the vapor pressure of the air to be treated and the vapor pressure of pure water at that temperature.

3. A system for cooling and adequately humidifying warm, abnormally dry outside air and introducing the conditioned air into a room, said system comprising a first stage comprising a coil containing an aqueous solution of hygroscopic substance, means for circulating said solution through said coil, evaporation cooling means in heat exchange relation to said coil, said evaporation cooling means being arranged to cool said solution to and maintain the temperature thereof near the wet bulb temperature of said outside air, air moving means for drawing outside air in contact with said evaporation cooling means; and a second stage utilizing said solution in contact with outside air to cool the air by heat exchange relation therewith, and to cool and humidify the air by evaporation thereinto, and to introduce the thus cooled and humidified air into the room.

4. A system for cooling and adequately humidifying warm, abnormally dry outside air and introducing the conditioned air into a room, said system comprising a first stage comprising a coil containing an aqueous solution of hygroscopic substance, means for circulating said solution through said coil, evaporation cooling means in heat exchange relation to said coil, said evaporation cooling means being arranged to cool said solution to and maintain the temperature thereof near the wet bulb temperature of said outside air, air moving means for drawing outside air in contact with said evaporation cooling means, and a second stage comprising an air conduit, contact cooling and humidifying means in said air conduit, and means for moving some of the warm abnormally dry outside air through said air conduit into the space to be cooled and humidified, said contact cooling and humidifying means comprising hygroscopic solution diffusing means fed with solution from said coil of the first stage, said diffusing means providing a diffused stream of said solution through the current of the outside air passing through said air conduit.

5. A system as recited by claim 4 wherein said solution diffusing means comprises spray means and humidifying pads upon which the solution is applied by said spray means.

6. A system as recited by claim 3 wherein said evaporation means comprises a wet pad enclosing said coil, a source of water for said wet pad, said air moving means operating to move dry warm outside air through said pad to evaporate the water in the pad and thereby cool the coil.

7. A system for cooling and humidifying abnormally dry, warm air and flowing the cooled and humidified air into a space to be cooled, said system comprising a first stage and a second stage, said first stage comprising an air conduit having an inlet and an outlet, and evaporative cooling means, said conduit having its outlet open to the outside air, and a fan for moving the air through said inlet to said outlet, said evaporative cooling means comprising a cold solution pipe cooled by a portion of said evaporative cooling means, said second stage comprising a spray fed by said cold solution pipe, humidifying pads below and sprayed by the solution from said cold solution pipe, a conduit in which said spray and humidifying pads are confined, said conduit having an inlet admitting warm abnormally dry outside air and a cooled and humidified air outlet opening into said space, and a fan drawing said outside air through said conduit upwardly through said pads and countercurrent to said spray and discharging the cooled and humidified air into said space, the air being simultaneously cooled by contact with the cold spray and humidified by passage through the pads in contact with the spray solution entrained therein.

8. A system for cooling and humidifying dry warm air and flowing the cooled and humidified air into a space to be cooled, said system comprising a first stage and a second stage, said second stage comprising a cold solution pipe, a spray fed thereby, humidifying pads below and sprayed by an aqueous solution of a hygroscopic substance from the solution pipe, a conduit in which said spray and humidifying pads are confined, said conduit having an outside air inlet and a cool and humidified air outlet opening into said space, and a fan drawing outside air through said conduit upwardly through said pads and counter-current to said spray and discharging the cooled and humidified air into said space, the air being simultaneously cooled by contact with the cold spray and humidified by passage through the pads in contact with the spray solution entrained therein; said first stage comprising an air conduit having an inlet and an outlet both open to the outside air, a fan for moving outside air through said conduit, and evaporating means for cooling the solution, comprising a coil in circuit with the cold solution pipe of the second stage, and having water holding covering means through which the outside air passes through the conduit of the first stage and wherein the water evaporates to reduce the temperature of the solution in said coil; and tilted baffles immediately above the humidifying pads of the second stage, said baffles receiving the impact of the spray and acting to evenly distribute the spray solution on the pads.

9. A system for cooling and humidifying dry warm air and flowing the cooled and humidified air into a space to be cooled, said system comprising a first stage and a second stage, said second stage comprising a cold solution pipe, a spray fed thereby, humidifying pads below and sprayed by an aqueous solution of a hygroscopic substance from the solution pipe, a conduit in which said spray and humidifying pads are confined, said conduit having an outside air inlet and a cooled and humidified air outlet opening into said space, and a fan drawing outside air through said conduit upwardly through said pads and countercurrent to said spray and discharging the cooled and humidified air into said space, the air being simultaneously cooled by contact with the cold spray and humidified by passage through the pads in contact with the spray solution entrained therein; said first stage comprising an air conduit having an inlet and an outlet both open to the outside air, a fan for moving outside air through said conduit, and evaporative means for cooling the solution, comprising a coil in circuit with the cold solution pipe of the second stage, and having water-holding covering means through which the outside air passes through the conduit of the first stage and wherein the water evaporates to reduce the temperature of the solution in said coil; the conduit of the second stage having doors exposing said pads when open, and said pads being removably mounted in said conduit for removal and replacement through the doors.

10. A system for cooling and humidifying dry warm air, and flowing the thus-treated air into a confined space; said system comprising a first stage and a second stage, with a hygroscopic solution circuit common to the two stages, and means for circulating the solution through the circuit; said first stage comprising a coil in the solution circuit, and means for cooling the solution in this coil to a temperature near the wet bulb temperature of the air-to-be-treated, by evaporating water in air of the same characteristics as the air-to-be-treated, in heat-exchange relation with said coil; said second stage comprising means for exposing said solution to heat-exchange relation and moisture-exchange relation with the air-to-be-treated, and means to force the air-to-be-treated into said heat-exchange relation and said moisture-exchange relation with the solution, and thence into the confined space.

11. A system for cooling and humidifying dry warm air, and flowing the thus-treated air into a confined space; said system comprising a first stage and a second stage, with a hygroscopic solution circuit common to the two stages, and means for circulating the solution through the circuit; said first stage comprising a coil in the solution circuit, and means for cooling the solution in this coil to a temperature near the wet bulb temperature of the air-to-be-treated, by evaporating water in air of the same characteristics as the air-to-be-treated, in heat-exchange relation with said coil; said second stage comprising means for exposing said solution to heat-exchange relation and moisture-exchange relation with the air-to-be-treated; means to force the air-to-be-treated into said heat-exchange relation and said moisture-exchange relation with the solution, and thence into the confined space; and means to maintain constant the concentration of the hygroscopic solution.

NEAL A. PENNINGTON.